Nov. 20, 1962     E. BAAS     3,064,839

LOADER FOR VEHICLES, TRACTORS, OR THE LIKE

Filed Jan. 14, 1959     2 Sheets-Sheet 1

INVENTOR.

Ervin Baas

BY

Nov. 20, 1962  E. BAAS  3,064,839
LOADER FOR VEHICLES, TRACTORS, OR THE LIKE
Filed Jan. 14, 1959  2 Sheets-Sheet 2

INVENTOR.
Erwin Baas
BY
Attorney

United States Patent Office 3,064,839
Patented Nov. 20, 1962

3,064,839
LOADER FOR VEHICLES, TRACTORS,
OR THE LIKE
Erwin Baas, 66 Up de Schanz, Hamburg-
Hochkamp, Germany
Filed Jan. 14, 1959, Ser. No. 786,737
Claims priority, application Germany Nov. 15, 1958
5 Claims. (Cl. 214—145)

The present invention relates to a loader having a boom adapted for up and down motion, especially in the form of a front or rear loader for tractors, motor vehicles, or the like.

Loaders of this type form have at their forward end a fork to which the tool is attached which carries the load. The loader boom may comprise one room only which forms a fork at its forward end, or it may consist of two parallel lifting arms, which is the more common system. In this embodiment, the two lifting arms also form a rigid fork at their front end adapted to carry different tools or implements, i.e. dirt buckets, manure forks, forage forks, root crop buckets, etc. The size and dimensions of the tools attached to the fork are adapted to the specific gravity of the material to be loaded. The volume of a dirt bucket, for instance, is much smaller than that of a root crop bucket, and a hay fork has a much bigger volume than a root crop bucket, in order to enable economical loading. These implements are attached to the loader and pivoted on the two ends of the fork. This is the case especially with implements used for goods of high specific gravity, i.e. soil, gravel, manure, etc. For light-weight goods, i.e. forage, hay, beets, potatoes, straw, etc., the tools are much wider than the fork of the loader arms. This difficulty was overcome by providing pivotal connections not at the outsides of the tool but inside. Such arrangement, however, prevents a clean pick-up of hay, grass, beets, etc., because on the one hand the implement cannot be filled completely when pushed into the material to be loaded, and on the other hand, some crops are easily damaged which affects their storage property. On wide tools it was also possible to arrange the pivot on the back side. In this embodiment, however, it was necessary to provide either a mechanical or a hydraulic return device (for use after emptying the bucket) or to provide these tools with counterbalance weights to facilitate their manually controlled return into initial position.

It is one object of the present invention to provide a loader for vehicles, tractors, or the like, which eliminates the above described deficiencies by providing laterally adjustable boom ends, so that implements of different width can be fitted between them. This results in a considerable simplification of the production of the different implements, as well as in a saving of weight, because counterbalance weights are no longer necessary, and in a saving of manufacturing cost, because a return of the tools by hand was not possible so far without counterbalance weights and additional mechanical, hydraulic or pneumatic return mechanisms had to be provided for this purpose.

It is another object of the present invention to provide a loader for vehicles, tractors or the like, wherein preferably, the fork ends are arranged to remain stationary in vertical direction and adapted to be horizontally adjustable parallel to each other through means of an intermediate member on the boom. It is of no importance whether the fork ends are adjusted together or individually. At its front end, the boom may have a cross member to guide the fork ends, the guide conveniently being formed of a pipe with open ends to receive a guide piece formed on the fork ends.

It is yet another object of the present invention to provide a loader for vehicles, tractors or the like, wherein to achieve vertical rigidity of the fork ends, the cross member may be profiled or constructed in the form of a double guide, a twin pipe for instance. It is also possible to pivot the fork ends on vertical axes on an intermediate member at the forward end of the boom to enable a swinging motion to the inside and to the outside. Through means of a locking mechanism, a locking bolt, struts, brackets, or the like, the fork ends can be arrested in their respective position.

With these and other objects in view, which will become apparent in the following detailed description, the present invention will be clearly understood in connection with the accompanying drawings, in which.

Figure 1:
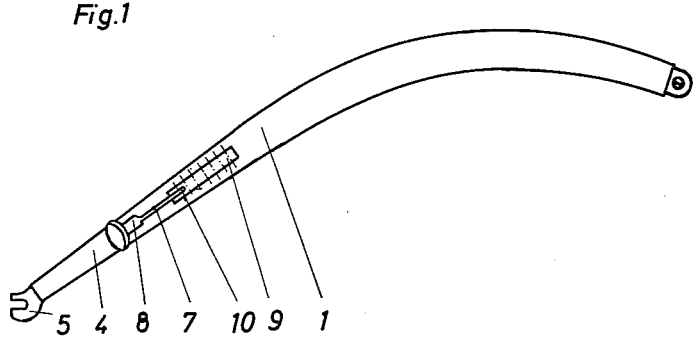
FIGURE 1 is a side elevational view of a boom, of a front-end loader for instance.

Referring now to the drawings, the boom or jib substantially comprises two parallel arms 1 extending forwardly, which at their front ends are connected with each other by means of a cross member 2, reinforced by brackets 3.

At the forward end of the boom there are fork ends 4 having an open bearing 5 into which the loading tool is pivotally mounted.

Figure 2:
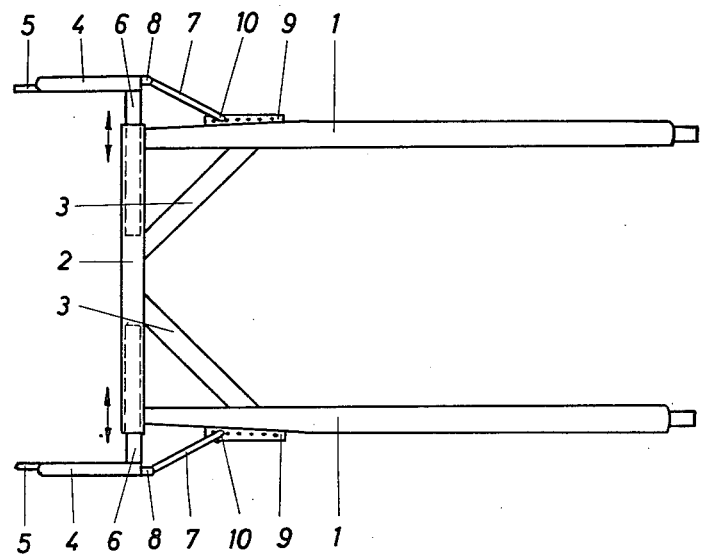
FIG. 2 is a top plan view of the boom shown in FIG. 1.

In the arrangement shown in FIGS. 1 and 2, the fork ends 4 are provided with guide members 6, formed of round iron, a pipe, or the like to telescope in the cross member 2 formed of a hollow pipe. Thus, the fork ends can be moved inwards and outwards, parallel to each other.

Arranged laterally on the arms 1, there is a rail 9, provided with holes. Extending backards, a support member 7 is pivoted on a pin 8 located on the fork rear ends. The member 7 can be secured in the holes of the rail 9 by means of a locking pin 10.

Figure 3:
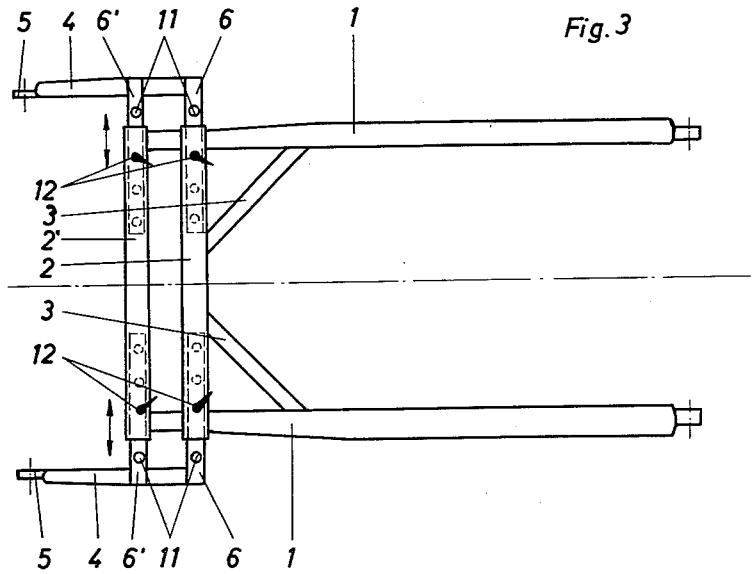
FIGS. 3 and 4 are top plan views of different embodiments of the boom.

In the embodiment disclosed in FIG. 3, the cross member 2 is replaced by a twin-pipe arrangement 2 and 2'. In this case, the fork ends 4 carry two parallel guide members 6 and 6' which are slidable in the two guides 2 and 2'. Furthermore, bores 11 are provided in the members 6, 6' and in the guides 2, 2' to enable different adjustments of the fork ends 4. By means of locking bolts 12 which are inserted into the bores 11 the fork ends are set at different working positions. The twin arrangement of the guides ensures perfect rigidity of the fork ends to prevent them from being bent-off.

Figure 4:
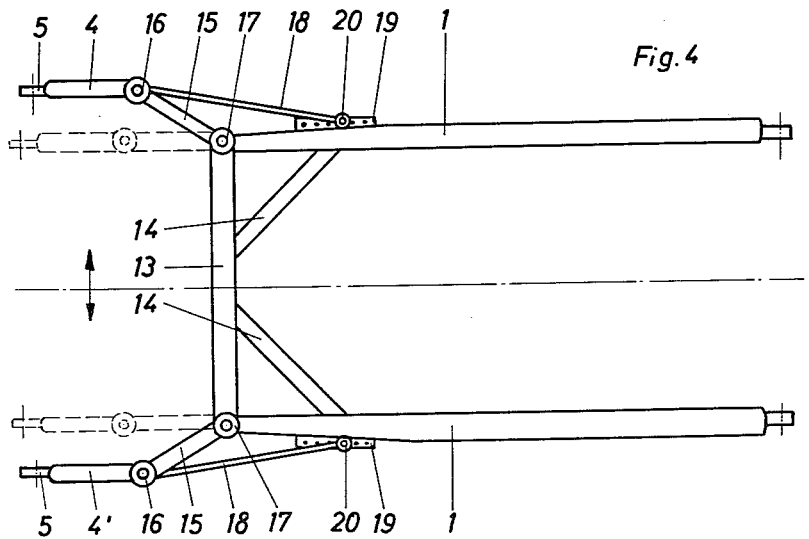

FIG. 4 shows a jib, comprising two arms 1 which at their front ends are reinforced by means of a cross member 13 and braces 14. Through means of an intermediate lever 15 the fork ends 4, 4' are arranged on the cross member 13 to pivot about vertical axes 17 and to be moved to the inside or outside. A rail 19 provided with holes is mounted on the outsides of the arms 1, and a brace 18 pivoted on a pin 16 can be secured in the rail by means of a locking bolt 20. In this arrangement, too, the fork ends 4' can be locked in various positions.

While I have disclosed several embodiments of the present invention, it is to be understood that these embodiments are given by example only and not in a limiting sense, the scope of the present invention being determined by the objects and the claims.

I claim:

1. A loader, as for vehicles, comprising a boom having two arms pivoted to be lifted about one end thereof, each of said arms including an attachment to a leverage support, cross bar means rigidly connecting said arms, fork means for supporting an implement therebetween at the operating end of said arms disposed parallel to each other and extending from both ends of said cross bar, said fork means having a variable operative width greater than the width between said arms of said boom, means for adjustably linking said fork means to said arms, and guide means at each end of said cross bar means for controlling the movement of said fork means and said linking means.

2. The loader, as set forth in claim 1, in which said cross bar means comprises a hollow cross-member connecting said arms, and a guide member constituting said guide means secured to each of said ends and telescoping in said hollow cross-member.

3. The loader, as set forth in claim 1, wherein said guide means comprises two parallel disposed, hollow cross-members connecting said arms, two guide members secured to each of said ends, and each of said guide members telescoping in the corresponding of said hollow cross-members.

4. The loader, as set forth in claim 1, which includes a cross-member connecting said arms, an intermediate lever pivotally connected to each end of said cross-member upon an axis disposed vertically to the plane formed by said bearings, and the free end of said intermediate levers being pivotally connected to said forked ends upon an axis parallel to said first mentioned pivotal axis.

5. The loader, as set forth in claim 1, which includes means for securing said guide means in any one of a plurality of adjusting positions.

References Cited in the file of this patent

UNITED STATES PATENTS

| | | |
|---|---|---|
| 1,884,861 | Remde | Oct. 25, 1932 |
| 2,309,730 | Hastings | Feb. 2, 1943 |
| 2,645,372 | Broersma | July 14, 1953 |
| 2,671,571 | Gerhardt | Mar. 9, 1954 |
| 2,706,570 | Jewell et al. | Apr. 19, 1955 |
| 2,714,461 | Walker | Aug. 2, 1955 |
| 2,887,236 | Mindrum | May 19, 1959 |